Oct. 14, 1930.    B. VALJEAN    1,778,437
FUEL HEAD CONTROL FOR OIL BURNERS
Filed Sept. 19, 1929
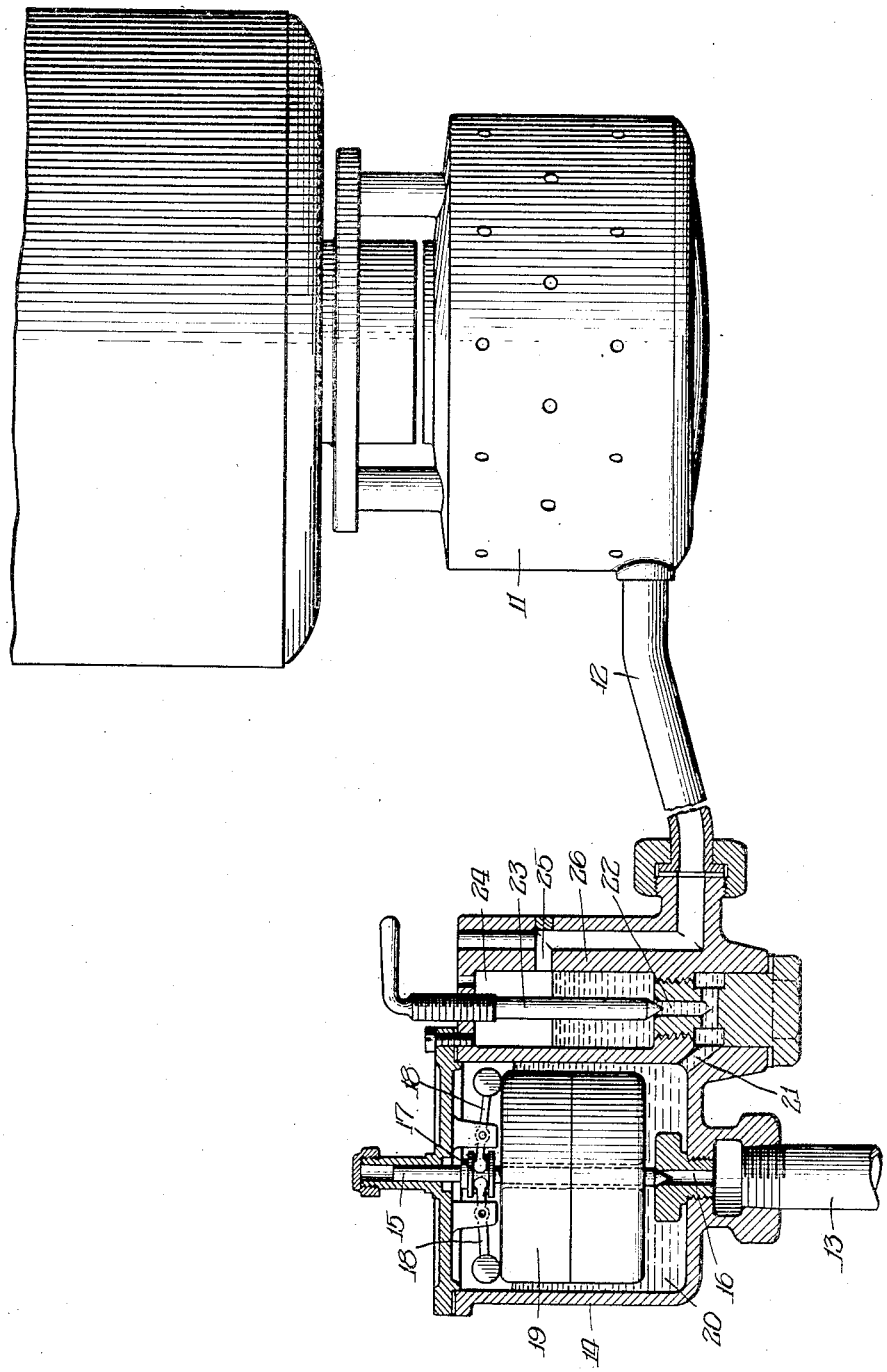
Inventor:
Ben Valjean,
By Cromwell, Greist & Warden
Attys Patented Oct. 14, 1930

1,778,437

UNITED STATES PATENT OFFICE

BEN VALJEAN, OF LANSING, MICHIGAN, ASSIGNOR TO MOTOR WHEEL CORPORATION, OF LANSING, MICHIGAN, A CORPORATION OF MICHIGAN

FUEL-HEAD CONTROL FOR OIL BURNERS

Application filed September 19, 1929. Serial No. 393,626.

Float chambers have been incorporated in oil flow burners in close conjunction with metering valves for the purpose of maintaining a desired oil flow to and proper oil level in the burner. While this is effective where the burner and fuel supply connections are stable as to elevation, as when resting upon a level floor; where they are subject to a tilting action as, for instance, if the burner be mounted on shipboard or carelessly installed on a floor, the effect is largely to nullify the head-controlling function of the float.

By my invention, I interpose between the metering valve and burner within or closely adjacent the float chamber a barrier or dam over which the oil discharges, the height of the barrier or dam being slightly less than the level in the float chamber. It is this dam, in combination with the float, which determines the head of the oil operating upon the metering valve and consequently the amount of oil supplied to the burner. Inasmuch as the float and dam are closely adjacent, the disturbing effect of any tilting action is reduced to a negligible minimum.

In valves designed for the accurate metering and gauging of fuel oil flow, it is necessary that a constant-head float valve be placed betwen the burner and the supply tank to insure a constant head and a constant flow through the valve regardless of whether the supply tank is full or nearly empty. In this type of valve, the head on the metering valve is very small and the float serves not only to hold this head constant but makes unnecessary the use of a packing box around the metering valve stem.

The amount of flow delivered through a metering valve, however, depends not only upon the head of oil entering into the valve but also upon the height of the discharge point. As in the type of valve to which this invention pertains, the head of oil entering the valve chamber is very low, any fluctuation in the discharge height will have a decided influence on the amount of the oil flowing. In an oil burner to which this metering valve discharges, the height of the oil depends upon conditions of use, whether the burner is dry and cold, just being started, or has become heated and the combustion fully under way. Also, if the burner and the auxiliary fittings are not exactly level, it will cause a change in the relation of the level of oil in the burner to that at the valve due to the distance between the burner and valve mechanism. It will be apparent that reliable results in metering oil will be impossible with such a float valve if the oil, after it passes tnrough the valve, is discharged directly to the burner. It is as essential to uniform oil flow and accurate metering that the discharge head of the oil be uniform as it is that the head of the entering oil be uniform. To accomplish this, it is necessary that the oil delivery from the metering valve be at or slightly below the constant-head float level. In practice, the maximum distance is about one-half inch, which difference in height is required to pass the oil through the valve so that slight fluctuations in the constant-head float itself should not materially affect this head.

However, this overflow or discharge point must not be below the desired oil level at the burner. Otherwise the amount of oil in the burner would affect the flow from the metering valve. This condition must also persist even though the meter be slightly out of level. This overflow point must be vented so that it does not siphon and so that the oil level in the burner does not influence it.

Metering valves of this type have heretofore lost much of their effectiveness because the oil was discharged directly from the valve to the burner and because the discharge from the valve was located considerably below the constant-head float level. It is to adapt these valves to being uniformly set and to make them accurately meter the oil without fluctuating in their flow by reason of changes in level that the present invention is directed.

In order that the invention may be readily understood, the same is described herein with reference to a typical embodiment of the same and illustrated in the accompanying drawing wherein is represented partially in elevation and partially in vertical section an embodiment of the same.

Having reference to the drawing, the burner 11 is of the Valjean carburetor type such as is set forth in connection with my patents numbered 1,512,869 and 1,639,202. To the bottom of this burner, through the pipe 12 is admitted a supply of oil from the pipe 13, a float valve mechanism being interposed in the path of the oil flow. The float valve casing is indicated at 14 and comprises generally the needle valve 15, controlling with its point the inlet port 16, the valve stem having adjustably mounted thereon a collar 17 with which engage the inner ends of two levers 18, the outer ends of the levers resting upon a float 19 disposed about the valve stem and buoyed up by the oil within the float chamber 20. Oil flows from the float chamber proper through the exit port 21 and thence through the port 22 controlled by the metering valve 23 to a secondary chamber 24. The discharge port 25, vented above to the atmosphere, taps the secondary chamber, as illustrated. slightly below the level of the oil maintained in the primary or float chamber by the float mechanism.

Theoretically, the overflow from the secondary chamber might be the same as the oil level in the primary chamber, but to prevent the oil level in the burner and any tilting of the apparatus influencing the metering device the discharge port 25 should be above the highest working oil level desired in the burner, and to prevent any irregularities in the float action from affecting the oil level and to provide sufficient head to maintain a proper flow through the valves, a difference in level of approximately one-half inch is found to be desirable.

Where the discharge from the float mechanism is at a point considerably below the oil level maintained in the float chamber, as for instance from the bottom of the secondary chamber, the effective head at the burner will vary with any relative difference in height between the burner and the float mechanism, and these two parts of the installation being often separated a considerable distance, any change in level and consequent fluctuation in head would become serious. By fixing the point of passage from the secondary chamber of the float mechanism closely adjacent the level maintained in the float chamber, the head at the burner is unaffected by any tilting which does not bring the desired oil level in the burner above the level of the oil in the secondary chamber as determined by the outlet port 25 defined by the height of the barrier 26.

I claim:

1. The combination with an oil burner and an oil supply passage leading thereto, of means to control the head of fuel for feeding the burner comprising a float chamber containing a float mechanism adjustable to maintain a constant oil level therein, a second chamber loosely adjacent the float chamber, a valve controlled passage between the two chambers, and a discharge port leading from the second chamber to the burner at a point above the normal level of the burner, the discharge from the second chamber being at a height slightly below the oil level maintained in the float chamber, whereby the desired oil flow to the burner is maintained substantially constant.

2. The combination with an oil burner and an oil supply passage leading thereto, of means to control the head of fuel for feeding the burner comprising a covered float chamber containing a float mechanism adjustable to maintain a constant oil level therein, a vented second chamber contiguous to the float chamber. a valve controlled passage between the two chambers, and a discharge port leading from the second chamber to the burner at a point above the normal oil level of the burner, the discharge from the second chamber being at a height slightly below the oil level maintained in the float chamber, whereby the desired oil flow to the burner is unaffected by tilting relative to the float chamber.

In testimony whereof I have hereunto subscribed my name.

BEN VALJEAN.

CERTIFICATE OF CORRECTION.

Patent No. 1,778,437.   Granted October 14, 1930, to

BEN VALJEAN.

It is hereby certified that error appears in the printed specification of the above numbered patent requiring correction as follows: Page 2, line 66, claim 1, for the word "loosely" read closely, and line 70, after the word "normal" insert the word "oil"; and that the said Letters Patent should be read with these corrections therein that the same may conform to the record of the case in the Patent Office.

Signed and sealed this 9th day of December, A. D. 1930.

(Seal)

M. J. Moore,
Acting Commissioner of Patents.